2,986,557
Patented May 30, 1961

2,986,557
POLYMERIZATION OF ETHYLENE IN THE PRESENCE OF VANADIUM-CONTAINING CATALYST

Robert L. Banks, Bartlesville, Okla., assignor to Phillips Petroleum Company, a corporation of Delaware No Drawing. Filed Mar. 28, 1958, Ser. No. 724,510

5 Claims. (Cl. 260—94.9)

This invention relates to a process for the polymerization of ethylene to normally solid polymers in the presence of a vanadium-containing catalyst. In another aspect this invention relates to a method of preparing a catalyst which is suitable for use in the polymerization of ethylene to normally solid polymer. In still another aspect this invention relates to a vanadium-containing catalyst which can be used in the preparation of solid polyethylene.

Solid polymers of ethylene have gained considerable commercial importance and have wide utility in the fields of packaging, protective coverings and molded articles. Films, sheets, containers, and the like, which are highly impermeable to moisture can be readily prepared from normally solid polymers of ethylene.

I have discovered a method of making solid polyethylene and a unique method of preparing a vanadium-containing catalyst by impregnating a silica-alumina support with vanadyl sulfate and activating the resulting impregnated support by heating in an oxygen-containing atmosphere. When ethylene is contacted with the catalyst thus prepared under polymerizing conditions, a solid polymer results. The production of solid polyethylene in this instance is quite surprising in view of the fact that vanadium-containing catalysts prepared from different vanadium-starting materials, or activated under reducing rather than oxidizing conditions, produced no solid polymer.

It is an object of my invention to provide a method of preparing a solid polymer of ethylene.

Another object of my invention is to provide a vanadium-containing catalyst which can be used to polymerize ethylene to a normally solid polymer.

Still another object of my invention is to provide a method by which such a catalyst can be prepared.

Other objects, advantages and features of my invention will be apparent to those skilled in the art from the following discussion and the claims.

The catalyst of my invention is prepared by impregnating a silica-alumina support with vanadyl sulfate and activating in an oxidizing atmosphere. While the term "support" is used to designate the silica-alumina portion of my catalyst, it is not meant to infer that this portion is inert since the activity of the total catalyst is affected by the nature and composition of the support. The amount of silica in the silica-alumina portion can range from 5 to 99 percent but is preferably in the range of about 80 to 95 weight percent with from 5 to 20 weight percent alumina. The silica-alumina portion should be a porous material, e.g., a gel, suitable for impregnation. Commercially available cracking catalysts containing silica and alumina in the prescribed ratios are quite suitable.

The support is impregnated with vanadyl sulfate, preferably in an aqueous solution in sufficient concentration to produce a finished catalyst having from 0.5 to 10 weight percent vanadium based on the total weight of the catalyst. For maximum activity it is preferred that the vanadium content of the catalyst be in the range of from 1 to 5 weight percent. The silica-alumina is mixed with the aqueous solution of vanadyl sulfate for a sufficient length of time to allow thorough impregnation. The excess solution is then removed and the catalyst is dried.

The impregnated catalyst is activated by heating at an elevated temperature for a sufficient length of time to increase the activity of the catalyst. This activation is effected in an oxidizing atmosphere at calcining temperatures of at leat 450° F., preferably about 700 to not substantially greater than 1500° F. The time of activation can vary over a broad range depending upon the temperature employed. A period of one minute can measurably activate the catalyst at the highest temperature, and activation periods of 50 hours or more can be employed at the lowest temperature. Generally, the period of activation is at least 30 minutes and preferably from about 3 to 10 up to 24 hours. The gas with which the catalyst is contacted during activation contains oxygen and is substantially free of water, for example, having a dew point below 75° F. and preferably below 0° F.

The polymerization reaction of my invention can be carried out by contacting ethylene with the catalyst prepared as described above under polymerizing conditions. The process can be conducted in either the gas phase or the liquid phase using a diluent with the catalyst in either a fixed bed, moving bed, fluidized bed or as a slurry in the diluent. The temperature of the polymerization is broadly within the range of about 100 to 500° F., but the preferred range is at least 150° F. and generally does not exceed 375° F. The pressure can vary from atmospheric for vapor phase reactions to 700 pounds per square inch absolute, or higher if desired. When a diluent is employed, the pressure is sufficient to maintain the diluent in the liquid phase and to dissolve sufficient ethylene in the diluent. Generally the pressure of the reaction is at least 100 to 300 pounds per square inch and is not over 500 pounds per square inch in most instances.

A liquid phase process is preferred in which a hydrocarbon diluent which is liquid, inert and nondeleterious under the reaction conditions is employed. Paraffinic and naphthenic hydrocarbons having from 3 to 12, preferably 5 to 12, carbon atoms per molecule can be utilized. Examples of such diluents are propane, isobutane, normal butane, normal pentane, isopentane, isooctane, cyclohexane and methylcyclohexane. The feed rate can range from 0.1 to 20 liquid hourly space velocity with a preferred range of 1 to 6 liquid hourly space velocity in a liquid phase process with a fixed bed catalyst. In a liquid phase process in which the catalyst is present as a slurry in the diluent the amount of catalyst based on the diluent is in the range of 0.01 to 10 weight percent. In a moving bed process the feed rate is about 2 to 6 v./v./hour with the ethylene concentration in the range of 0.1 to 25 weight percent and the catalyst rate from 0.1 to 0.5 v./v./hour.

The solid polyethylene is formed either as a deposit on the catalyst or in solution in the liquid diluent and can be recovered from solution by precipitation, such as by cooling the solution or by evaporating the solvent. Ordinarily the catalyst is filtered from the solution before precipitation but in certain applications, for example, when the polymer is to be pigmented with carbon black, the catalyst can be allowed to remain in the solid polymer. Solid polyethylene formed as a deposit on the catalyst can be removed with suitable solvent at elevated temperatures and recovered from solution in the same manner.

Advantages of this invention are illustrated by the following examples. The reactants, and their proportions, and other specific conditions are presented as being typical and should not be construed to limit the invention unduly.

Example I

A 500 cubic centimeter solution was prepared from distilled water and 24 grams of vanadyl sulfate $$(VOSO_4 \cdot 2H_2O)$$

This solution was added to 250 cubic centimeters of low density silica-alumina (Davison MF F–1 cracking catalyst, 13 weight percent alumina–87 percent silica). The mixture was stirred several times over a 15-minute period. This excess solution was removed and the catalyst dried in an evaporating dish on a hot plate. A portion of the dried catalyst was then activated with dry air at 950° F. for five hours. Five and 8/100 (5.08) grams of the activated catalyst along with 300 cubic centimeters of acid-treated cyclohexane was charged to a one-liter reactor equipped with an internal stirrer. The stirrer was started and the reactor heated to 270° F. Ethylene was then added and the reaction conditions were maintained at 285° F. and 450 p.s.i.g. for 1¼ hours. 7.4 grams of solid polyethylene was recovered. This provided a yield of 1.5 grams solid polymer per gram of catalyst. The catalyst contained 3.1 weight percent vanadium and 1.12 percent sulfur. The solid polyethylene had an inherent viscosity of 3.74 as determined at 130° C. with 0.1 gram of polymer in 50 milliliters of tetralin.

*Example II*

A silica-alumina cracking catalyst, as employed in the impregnation step of Example I, was activated under the same conditions employed in Example I without the step of impregnating the catalyst with vanadyl sulfate. The unpromoted silica-alumina catalyst was then employed in the polymerization of ethylene under the same conditions as given in Example I. In this run 0.6 gram of solid polyethylene was obtained giving a yield of 0.14 gram of polymer per gram of catalyst.

As shown by Examples I and II, the catalyst of my invention promoted by impregnating with vanadyl sulfate provides a yield of solid polyethylene which is greatly improved over the yield obtained with the unpromoted silica-alumina catalyst.

*Example III*

Two hundred fifty (250) cubic centimeters of impregnating solution was prepared by adding 12.0 grams vanadyl sulfate ($VOSO_4 \cdot 2H_2O$) to distilled water. Two hundred twenty (220) cubic centimeters of this solution was added to 150 cubic centimeters of commercial microspheroidal 87 percent silica–13 percent alumina cracking catalyst. The mixture was stirred every three to hour minutes. After 15 minutes the excess solution was removed by filtering and the impregnated catalyst was dried in an evaporating dish on a hot plate with constant stirring. Seventy (70) cubic centimeters of the dried catalyst was activated for four hours at 950° F. with dry air at a space velocity of 700 v./v./hour.

Four (4.00) grams of the activated catalyst was tested in a one-liter stirred reactor for polymerization of ethylene at 285° F. and 450 p.s.i.g. Three hundred (300) grams of cyclohexane solvent was used. After two hours the reactor was opened and 8.4 grams of solid polymer plus catalyst was recovered. Thus the yield equaled 1.1 grams of solid polymer per gram of catalyst. The catalyst contained 2.50 weight percent vanadium and 1.0 weight percent sulfur.

*Example IV*

Fifty (50) cubic centimeters of the unactivated catalyst prepared in Example III was activated for four hours at 950° F. with hydrogen at a space velocity of about 700 v./v./hour. The catalyst contained 2.54 weight percent vanadium and 0.03 weight percent sulfur.

Four and 5/100 grams (4.05) of this hydrogen-activated catalyst was tested for ethylene polymerization in the same way as described in Example III. No solid polymer was produced.

*Example V*

Two hundred fifty (250) cubic centimeters of impregnating solution was prepared by adding 15.5 grams vanadyl oxalate and 30 cubic centimeters of 70 percent nitric acid to distilled water. Using this solution a catalyst was prepared, air activated at 950° F. and tested for ethylene polymerization using the same procedures described in Example III. No solid polymer was produced. The catalyst contained 2.47 weight percent vanadium and 0.06 percent sulfur.

Examples III to V show that the catalyst prepared from vanadyl sulfate and activated in air is unique in its ability to produce solid polymers of ethylene. Since the catalyst prepared from vanadyl oxalate and activated in air and the catalyst prepared from vanadyl sulfate and activated in hydrogen were inactive for the production of solid polyethylene, the results of the catalyst of my invention are quite surprising.

As will be evident to those skilled in the art, various modifications of this invention can be made, or followed, in the light of this foregoing disclosure and discussion, without departing from the spirit or scope thereof.

I claim:

1. A method of polymerizing ethylene to a normally solid polymer which comprises contacting ethylene under polymerizing conditions with a catalyst prepared by impregnating a silica-alumina support with vanadyl sulfate and activating the impregnated support by heating in an oxygen-containing atmosphere.

2. A method of polymerizing ethylene to a normally solid polymer which comprises contacting ethylene under polymerizing conditions including a temperature in the range of about 150° F. to 375° F. and superatmospheric pressure with a polymerization catalyst consisting essentially of silica, alumina and a vanadium compound, said catalyst containing from 0.5 to 10 weight percent vanadium and having been prepared by impregnating a silica-alumina support with vanadyl sulfate and activating the impregnated support by heating for at least 1 minute at an elevated temperature in the range of 450 to about 1500° F. in an oxygen-containing atmosphere, and recovering a solid polymer of ethylene.

3. A method of polymerizing ethylene to a normally solid polymer which comprises contacting ethylene in the presence of inert liquid hydrocarbon diluent, at a temperature in the range of about 150° F. to 375° F. and a pressure sufficient to maintain said diluent in the liquid phase with a catalyst consisting essentially of silica, alumina and a vanadium compound, said catalyst containing from 0.5 to 10 weight percent vanadium and having been prepared by mixing a silica-alumina cracking catalyst with an aqueous solution of vanadyl sulfate, drying said silica-alumina catalyst thereby forming a vanadyl sulfate-impregnated catalyst, and heating said impregnated catalyst in an oxygen-containing atmosphere at a temperature in the range of 700 to 1500° F. for at least 30 minutes, and recovering a solid polymer of ethylene.

4. A method of polymerizing ethylene to a normally solid polymer according to claim 3 wherein said silica-alumina cracking catalyst contains from 80 to 95 weight percent silica and said polymerization catalyst contains from 1 to 5 weight percent vanadium.

5. The method of claim 3 wherein said oxygen-containing atmosphere is dry air.

References Cited in the file of this patent

UNITED STATES PATENTS

| | | |
|---|---|---|
| 2,683,140 | Howard | July 6, 1954 |
| 2,734,874 | Drake et al. | Feb. 14, 1956 |
| 2,746,936 | Plank | May 22, 1956 |
| 2,880,201 | Peters et al. | Mar. 31, 1959 |